United States Patent
Haberman (10) Patent No.: US 10,410,263 B2
(45) Date of Patent: Sep. 10, 2019

(54) SYSTEMS AND METHODS FOR MANAGING DIGITAL ASSET EXCHANGES

(71) Applicant: Seth Haberman, New York, NY (US)

(72) Inventor: Seth Haberman, New York, NY (US)

(*) Notice: Subject to any disclaimer, the term of this patent is extended or adjusted under 35 U.S.C. 154(b) by 502 days.

(21) Appl. No.: 14/547,032

(22) Filed: Nov. 18, 2014

(65) Prior Publication Data

US 2015/0142603 A1 May 21, 2015

Related U.S. Application Data

(60) Provisional application No. 61/905,510, filed on Nov. 18, 2013.

(51) Int. Cl.
| | |
|---|---|
| *G06Q 30/00* | (2012.01) |
| *G06Q 30/06* | (2012.01) |
| *G06Q 20/12* | (2012.01) |
| *G06Q 30/02* | (2012.01) |

(52) U.S. Cl.
CPC ....... *G06Q 30/0603* (2013.01); *G06Q 20/123* (2013.01); *G06Q 30/0278* (2013.01); *G06Q 30/0633* (2013.01)

(58) Field of Classification Search
CPC .......... G06Q 30/0601–0645; G06Q 30/0278
USPC ...................... 705/26.1–27.2, 306
See application file for complete search history.

(56) References Cited

U.S. PATENT DOCUMENTS

| | | | | |
|---|---|---|---|---|
| 2006/0229989 | A1* | 10/2006 | Fontijn | G06Q 20/12 705/50 |
| 2008/0228578 | A1* | 9/2008 | Mashinsky | G06F 21/10 705/14.54 |
| 2010/0332342 | A1* | 12/2010 | DeGroot | G06Q 30/0611 705/26.4 |
| 2015/0206228 | A1* | 7/2015 | Perez | G06Q 30/0645 705/26.3 |

OTHER PUBLICATIONS

Wave systems to bundle an encrypted version of JOT-IT! software. (Jun. 26, 1997). Business Wire Retrieved from https://dialog.proquest.com/professional/docview/677577218?accountid=142257.*

* cited by examiner

*Primary Examiner* — Resha Desai
(74) *Attorney, Agent, or Firm* — Seyfarth Shaw LLP; George Haight (57) ABSTRACT

Methods, systems, and computer-readable media for the exchange of digital assets are generally described. In some embodiments, a digital asset exchange system (the "exchange system") may generate a catalog of available digital assets stored on a plurality of client logic devices or storage devices. The exchange system may determine a value for the digital assets. A user may request to exchange a digital asset in the catalog with one of their digital assets. The exchange system may process the exchange of the digital assets have an equivalent or substantially equivalent value. If the value of the digital assets is not equivalent, the exchange system may suggest digital assets for the exchange and/or initiate negotiations between the users.

20 Claims, 4 Drawing Sheets

SYSTEMS AND METHODS FOR MANAGING DIGITAL ASSET EXCHANGES

CROSS REFERENCE TO RELATED APPLICATIONS

This application claims the benefit of U.S. Provisional Application No. 61/905,510 filed on Nov. 18, 2013, the contents of which are incorporated by reference in their entirety as if fully set forth herein.

FIELD OF INVENTION

The described technology generally relates to an automated, computer-implemented forum for valuing and exchanging digital assets and, more specifically, to an exchange system configured to generate a catalog of digital assets stored on a plurality of computing devices and to facilitate the non-monetary exchange of digital assets therebetween by trading the digital assets based on their fair market value.

BACKGROUND

Technological advancements have caused the digital storage of content assets to be the predominant method for storing and accessing content, such as music and movies. In addition, advances in storage capacity have allowed analog content and individual digital storage mediums, such as compact discs (CDs), digital video discs, and Blu-Ray™, to be saved and accessed from digital storage devices, including computing devices and external storage devices.

Despite the improved access to digital content assets, bona fide purchasers of content still do not have legitimate technologies capable of allowing users to share, trade, and acquire digital assets using a library or catalogue of their own for exchange with the digital assets of others. Consequently, as media and electronic devices have drastically improved, the ability to legally and dependably share and exchange those digital assets and media has not maintained the same pace. Accordingly, digital content providers and consumers would benefit from a system that facilitates the non-monetary trading or exchanging of digital assets.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a system configured to exchange digital assets may include a processor and a non-transitory, computer-readable storage medium in operable communication with the processor, wherein the computer-readable storage medium contains one or more programming instructions. The one or more programming instructions, when executed, cause the processor to access a digital asset catalog comprising asset information associated with a plurality of digital assets stored on a plurality of client logic devices, receive an exchange request from a requesting client logic device to exchange at least one selected digital asset in the digital asset catalog, determine a selection value for the at least one selected digital asset, determine whether the requesting client logic device comprises at least one tradable digital asset having a tradable value substantially equivalent to the selected asset value, and exchange the at least one selected digital asset and the at least one tradable digital asset responsive to the tradable value being substantially equivalent to the selected asset value.

In an embodiment, a computer-implemented method for exchanging digital assets may include, by a processor, accessing a digital asset catalog comprising asset information associated with a plurality of digital assets stored on a plurality of client logic devices, receiving an exchange request from a requesting client logic device to exchange at least one selected digital asset in the digital asset catalog, determining a selection value for the at least one selected digital asset, determining whether the requesting client logic device comprises at least one tradable digital asset having a tradable value substantially equivalent to the selected asset value, and exchanging the at least one selected digital asset and the at least one tradable digital asset responsive to the tradable value being substantially equivalent to the selected asset value.

In an embodiment, a computer-readable storage medium having computer-readable program code configured to exchange digital assets may include computer-readable program code configured to access a digital asset catalog comprising asset information associated with a plurality of digital assets stored on a plurality of client logic devices, computer-readable program code configured to receive an exchange request from a requesting client logic device to exchange at least one selected digital asset in the digital asset catalog, computer-readable program code configured to determine a selection value for the at least one selected digital asset, computer-readable program code configured to determine whether the requesting client logic device comprises at least one tradable digital asset having a tradable value substantially equivalent to the selected asset value, and computer-readable program code configured to exchange the at least one selected digital asset and the at least one tradable digital asset responsive to the tradable value being substantially equivalent to the selected asset value.

BRIEF DESCRIPTION OF THE DRAWINGS

The above and other objects of the present invention will become more readily apparent from the following detailed description taken in connection with the accompanying drawings.

DETAILED DESCRIPTION

The described technology generally relates to systems and methods for exchanging digital assets between a plurality of client logic devices. In particular, some embodiments may provide a digital asset exchange system (the "exchange system" or "system") for users to view the digital assets of other users and to swap, trade, barter, or otherwise acquire the digital assets in exchange for their digital assets in their own collection. A digital asset may generally include content in a digital form, which may include any type of data, information, media, or the like that may be expressed through a medium. Non-limiting examples of mediums may include audio and visual mediums such as television, radio, and broadcast, computing devices and other logic devices, digital media players, and cable, satellite, and/or network (e.g., Internet) forms thereof. Illustrative forms of content may include, but are not limited to, video, audio, movies, video games, television and radio programs, commercials, websites, images, photographs, text, electronic or digital documents, and/or combinations thereof In some embodiments, the exchange system may be configured to compile a catalog of digital assets (the "digital asset catalog") available through a plurality of client logic devices. The exchange system may be configured to determine a value for each digital assets and/or collections thereof. In some embodiments, the values of the digital assets may include a "fair market value" or "equitable exchange value" based on publicly available information, user input regarding value, content provider information, or any combination thereof. In some embodiments, the value of the digital assets may fluctuate dynamically based on information received by the exchange system.

Users may access the exchange system and browse the available digital assets and make selections for exchange. For instance, a first user may choose a digital asset from the digital asset catalog (a "selected digital asset") that is stored on the client logic device of a second user. The exchange system may determine a value or range of values for the selected digital asset. In some embodiments, the first user may offer a digital asset in exchange for the selected digital asset (a "tradable digital asset") that the first user is willing to trade for the selected digital asset. In some embodiments, the exchange system may search the digital assets of the second user, determine the values thereof, and make a recommendation for the tradable digital assets. The exchange system may determine whether value of the tradable digital asset and the selected digital asset are equivalent or substantially equivalent. If these values are equivalent or substantially equivalent, the exchange system may notify the second user of the proposed exchange of the selected digital asset for the tradable digital asset by the first user. The first user may approve or decline the exchange.

In some embodiments, equivalent or substantially equivalent may mean having essentially the same value (i.e., the same dollar value). In some embodiments, equivalent or substantially equivalent may include having a value within a tolerance threshold, such as 2%-20%. In some embodiments, the tolerance threshold may be specified by a user, the exchange system, or a combination thereof. If the second user approves of the exchange, the first user may upload the selected digital asset to their client logic device and the second user may upload the tradable digital asset to their client logic device through the exchange system. If the second user declines the exchange, the first user and the second user may negotiate and/or request alternative assets through the exchange system.

The exchange system may determine the value of digital assets using various information sources, including publicly available information, proprietary data sources, and/or third-party data sources. Non-limiting examples of data sources include websites, content databases (e.g., Netflix®, iTunes™, or the like), social network services, crowd-sourcing services, content provider catalogs, retailer web-sites, proprietary databases, user valuations, or the like. The exchange system may dynamically determine the value of a digital asset in real time or substantially real-time based on various factors, such as trending popularity and/or demand for a particular digital asset. For example, retail prices available online and past transactions may indicate that a digital asset has a certain value. However, demand for the asset on the digital exchange, user-provided values, crowd-sourcing values, digital asset rental or purchase demand, and/or social networking trends may indicate that the value of the asset has fluctuated higher (or lower).

Embodiments may include systems and methods for efficiently swapping, trading, exchanging, and or acquiring digit assets, and other media content. Additional embodiments described herein may include the capability to determine fair market value for any number of digit assets through publicly available information, including but not limited to key word searches, website searches, database queries, etc. Another embodiment described herein may include the capability to link users on a global network who have similar digit assets for exchange.

As previously mentioned, conventional technology does not provide a market or platform to connect content consumers to each other as a means to exchange digital content return for other equally comparable digit assets in real-time or substantially real-time. Accordingly, some embodiments provide for the ability to trade digital assets, in return for like-kind digit assets.

For example, according to one embodiment, individuals who own extensive libraries or catalogs of digital media content who seek to acquire, exchange or trade their digital assets in return for other comparable digital assets, may have a forum or mechanism in which to do so. Embodiments may include a computer-based, electronic forum which allows users to globally connect through a network to exchange and view other user's digital assets. Users have the opportunity to review other's catalogs and initiate exchange discussions and negotiations based on user libraries. Embodiments may include use of a network that may include, but is not limited, to a local area network (LAN), a wide area network (WAN), storage area network (SAN), the Internet, a shared network, document storage, a wireless network (e.g., WiFi), a telecommunications network (e.g. 3G, 4G, LTE, etc.), and any other type of network now known or developed in the future.

In some embodiments, the exchange system may serve as a marketplace, central clearinghouse or listing of assets. A user searching for a particular asset may search the marketplace and, upon finding another user seeking to traded that asset, inform the acquiring user of such availability and propose a nominal trade value for that asset. The marketplace may connect the two users directly, or the marketplace may execute all transactions such that the users remain anonymous to each other, thereby protecting any privacy concerns of the users.

The exchange system described according to some embodiments provides multiple technological advantages and technical effects on processes and techniques, including processes and techniques external to the exchange system. Conventional systems and processes cannot implement a digital asset exchange system in real-time or substantially real time, including providing a digital asset catalog and values of digital assets. A non-limiting technological advantage and technical effect of the exchange system according to some embodiments is that the exchange system may allow certain devices, such as computing devices, to operate more effectively and efficiently when being used to exchange digital assets. Therefore, the exchange system according to some embodiments may operate to improve the process of buying, selling, and/or exchanging digital assets by making the process more efficient, accurate, and cost-effective and may improve the user experience of users as they acquire, sell, and/or exchange digital assets using a client logic device.

Figure 1:
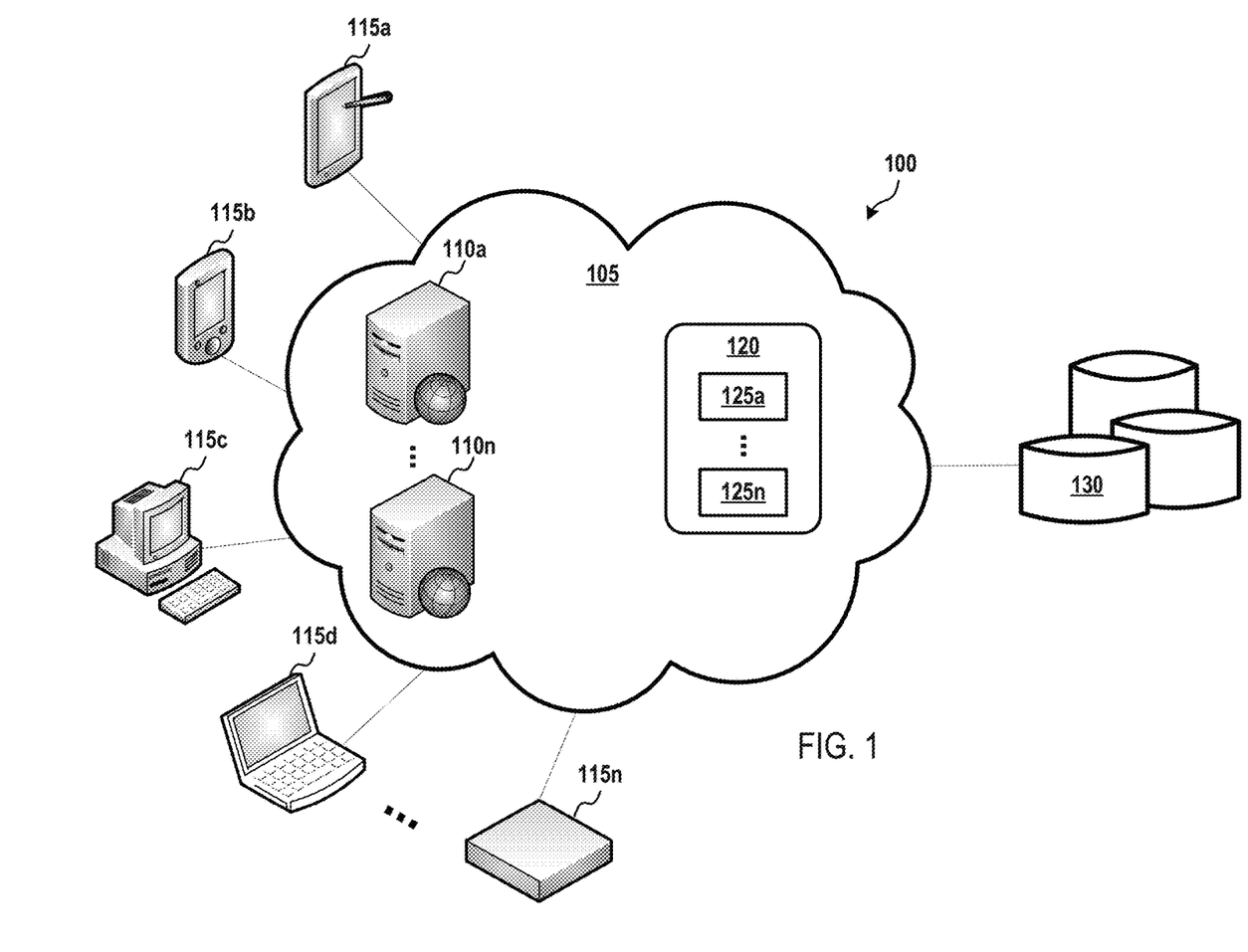
FIG. 1 depicts an illustrative digital asset exchange system according to some embodiments.

FIG. 1 depicts an illustrative digital asset exchange system according to some embodiments. As shown in FIG. 1, the digital asset exchange system (the "exchange system" or the "system") 100 may include one or more server logic devices 110a-n, which may generally include a processor, a non-transitory memory or other storage device for housing programming instructions, data or information regarding one or more applications, and other hardware, including, for example, the central processing unit (CPU) 405, read only memory (ROM) 410, random access memory (RAM) 415, communication ports 470, controller 420, and/or memory device 425 depicted in FIG. 4 and described below in reference thereto.

In some embodiments, the programming instructions may include a digital asset exchange application (the "exchange application" or the "application") configured to, among other things, access information associated with digital assets stored on client logic devices 115a-n, generate a digital asset catalog 120 of digital asset information 125a-n, determine the value of the digital assets, and facilitate the exchange of digital assets between client-logic devices.

The server logic devices 110a-n may be in operable communication with client logic devices, including, but not limited to, server computing devices, personal computers (PCs) 115c, kiosk computing devices, mobile computing devices, laptop computers 115d, smartphones 115b, personal digital assistants (PDAs), global positioning system (GPS) devices, televisions (i.e., "smart" televisions), printing devices, tablet computing devices 115a, in-care entertainment (ICE) systems, storage devices 115n, electronic reading devices ("e-readers"), or any other logic and/or computing devices now known or developed in the future.

In some embodiments, the exchange application may be accessible through various platforms, such as a client application, web-based application, over the Internet, and/or a mobile application (for example, a "mobile app" or "app"). According to some embodiments, the exchange application may be configured to operate on each client logic device 115a-n and/or to operate on a server computing device accessible to client logic devices over a network, such as the Internet. All or some of the files, data and/or processes used for cataloging, exchanging, and/or valuing digital assets may be stored locally on each client logic device 115a-n and/or stored in a central location and accessible over a network (e.g., the Internet or on server logic devices 110 a-n).

In an embodiment, one or more data stores 130 may be accessible by the client logic devices 115a-n and/or server logic devices 110 a-n. The data stores 130 may include information use for obtaining digital asset information (e.g., titles, creators, artists, publishers, distributors, versions, quality, compatible mediums, file types, compression information, duration, actors, musicians, writers, directors, legal information, or the like), digital asset values, digital asset compliance (e.g., copyright information, restrictions on copying, distribution, or the like, information and/or processes for deleting or otherwise restricting exchanged digital assets to comply therewith), or any other information used or required by the exchange system 100 to operate according to some embodiments. In some embodiments, the data stores 130 may include value information sources that the exchange system 100 may use to determine the value of digital assets. Non-limiting examples of value information sources may include user-defined values (e.g., values submitted by users to the exchange system 100), retail information sources (e.g., Amazon, retailer websites, etc.), social network services (e.g., Facebook®, Twitter®, etc.), crowd-sourcing services and applications, news websites, auction services (e.g., eBay), classified advertisements (e.g., Craigslist), any other source that may provide information regarding value, demand, popularity, rarity, or the like of a digital asset, and/or word searches, website searches, database queries of any of the foregoing.

Although the one or more data stores 130 are depicted as being separate from the logic devices 105a-n, 110a-n, embodiments are not so limited, as all or some of the one or more data stores may be stored in one or more of the logic devices.

In some embodiments, a user may access the exchange application operating on the server logic devices 110a-n through a client logic device 105a-n via network 105, such as through a mobile app operating on a smartphone. In some embodiments, a user may create a user profile, user account, or otherwise register with the exchange application. The server logic devices 110 a-n may store information associated with the user, such as username and password information to access the exchange application and/or enhanced features thereof, payment information for fee-based functions and services, demographic information, user preferences, historical information (e.g., past exchanges, etc.), or the like.

Although individual client logic devices 105a-n are depicted in FIG. 1, embodiments are not so limited. For example, the exchange system 100 may also be used by entities for the exchange of content, such as content producers, movie production companies, music clearinghouses, music recording companies, radio stations, television stations, broadcast networks, websites, cable and satellite television providers, or the like. In this manner, the exchange system 100 may operate as an exchange marketplace for content providers to obtain content for providing to customers.

The exchange application may create a catalog 120 with digital asset information (or "digital asset entries" or "digital asset records") 125a-n for each digital asset. In some embodiments, the exchange application may be configured to scan or otherwise examine the digital assets stored on and/or available through a client logic device 105a-n to record the digital assets in the catalog. In some embodiments a user may specify which assets to include in the digital asset catalog 120 and which not to include. In some embodiments, the exchange application may allow a user to modify or annotate a digital asset record 125a-n for a digital asset. For instance, a user may specify certain types of digital assets that the user may consider in an exchange, preferences, digital asset values, instructions, or the like.

Figure 2:
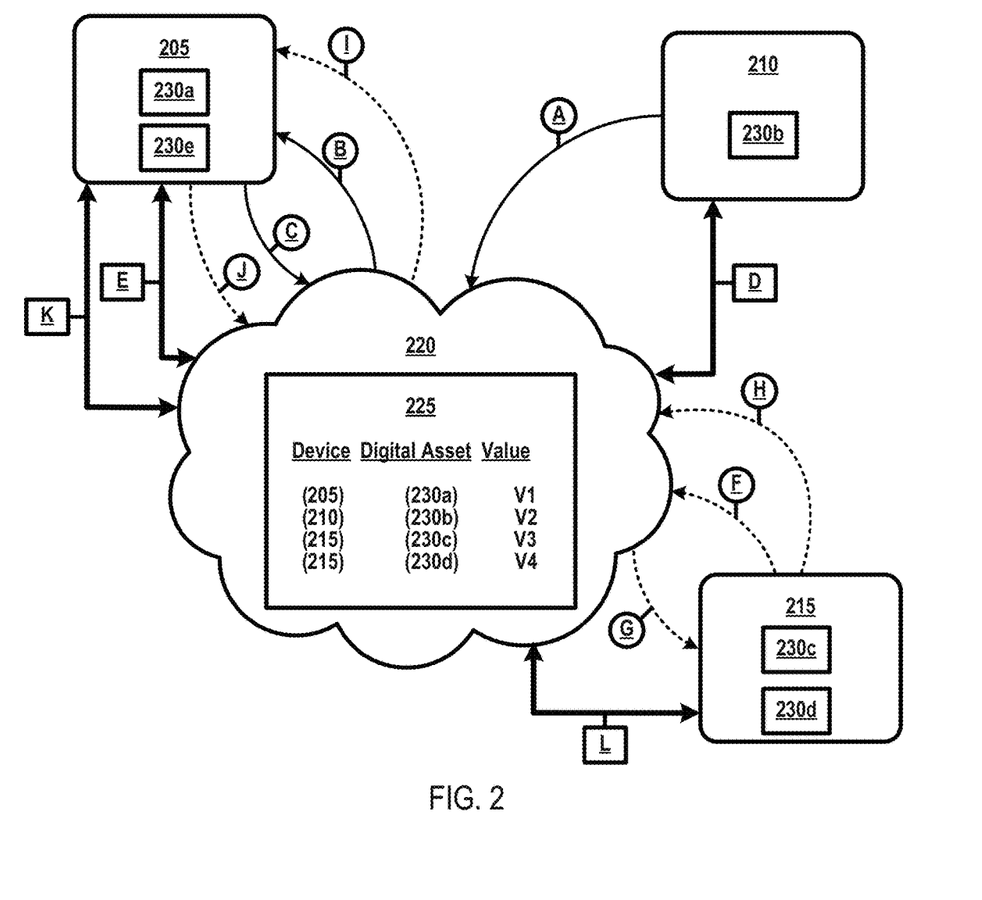
FIG. 2 depicts an illustrative digital asset exchange system according to an embodiment.

FIG. 2 depicts an illustrative digital asset exchange system according to an embodiment. As shown in FIG. 2, an exchange system 220 may include a digital asset catalog 225. The digital asset catalog 225 may include digital asset records (or "records") for each available digital asset. The records may include information associated with the digital assets available through the exchange system 220, including source device, source user (e.g., username or "handle"), digital asset information (e.g., title, category, medium, file type, or the like), estimated download time, source geographic region, values or ranges of values, user historical information (e.g., activity, previous trades, or the like), user preferences (e.g., trade preferences, such as file type, preferred artists, genres, or the like), device type, encryption information, storage location (e.g., local storage, cloud storage, external hard drive, or the like), or any other information that may be associated with a digital asset, client logic device, or user.

A client logic device 210 may access the exchange system 220 and browse the catalog 225, including via keyword searching, genre searching, menus, exchange system recommendations, user recommendations, or the like. The client logic device 210 may send an exchange request A to the exchange system 220 indicating that the user of the client logic device is interested in digital asset 230a stored on client logic device 205. The exchange request A may include various types of information, including tradable assets, user information, client logic device information, user preferences, user-defined tradable asset value, or the like. For instance, the exchange request A may include a selected digital asset (i.e., digital asset 230a) and a tradable digital asset (i.e., 230b). In general, the tradable digital asset is a digital asset that the requesting user may trade for the selected digital asset.

In some embodiments, a user may specify or offer one or more tradable assets when initiating the exchange for the selected digital asset. In some embodiments, a user may select a digital asset and the exchange system 220 may search the available digital assets of the requesting user to determine digital assets that may be used for the exchange based on various factors, such as the value of the digital assets, the preferences of the requesting user and/or the owner of the selected digital asset, characteristics of the digital assets (i.e., similar artists, genres, playback devices, etc.), or the like. In some embodiments, a user may specify a tradable asset and the exchange system 220 may provide one or more selectable assets that may be equivalent to the tradable asset based on various factors, including value, user preferences, or the like.

The exchange system 220 may determine a value for the selected digital asset 230a and the tradable digital asset 230b. If the value of the tradable digital asset 230b is equivalent or substantially equivalent to the selected digital asset 230a, the exchange system 220 may transmit a message B to the client logic device 205 associated with the selected digital asset 230a. The user of client logic device 205 may respond C indicating whether they approve or decline the exchange. If the user accepts the exchange, the requesting client logic device 210 may upload D the tradable digital asset 230b to the exchange system 220 and the client logic device 205 may download E the tradable digital asset from the exchange system. In addition, the client logic device 205 may upload E the selected digital asset 230a to the exchange system 220 and the requesting client logic device 210 may download D the selected digital asset from the exchange system. In some embodiments, the exchange system 220 may perform various checks on the digital assets, such as checks to determine whether the digital assets are genuine, contain errors, are copies, or the like. In some embodiments, the exchange system 220 may not allow the digital assets to be downloaded until each corresponding digital asset has been uploaded to the exchange system and/or has passed the checks.

In some embodiments, at the point when both sides have agreed to an equivalent exchange, the digital assets 230a, 230b may be uploaded to a central location, maintained by the marketplace, and made available for download. In some embodiments, a client application running on the client logic devices 205, 210 may then delete, lock, or otherwise restrict usage of the digital assets 230a, 230b that have been uploaded (i.e., that have been transferred as part of the exchange) in order to comply with any applicable digital rights management issues. For example, if the particular asset to be exchanged included metadata restricting the illegal copying or transfer of the asset, the client application may read such information and take appropriate action upon the completion of the transaction.

As shown in FIG. 2, a client logic device 215 may transmit an exchange request F to exchange selected digital asset 230e for tradable digital asset 230c. The exchange system 220 may compare the value of the selected digital assets 230e for tradable digital asset 230c and determine that the digital assets do not have equivalent values as the value of the tradable digital value is too low. The exchange system 220 may transmit a message G to the requesting client logic device 215 indicating that the selected digital assets 230e and the tradable digital asset 230c do not have equivalent values and suggesting that the combined value of digital asset 230d with the tradable asset may be sufficient to make the exchange. In some embodiments, a user may make up for the value difference between digital assets using money, points, or any other item that may be used as part of an exchange.

The requesting client logic device 215 may transmit a message H indicating approval of the suggested exchange of tradable digital assets 230c and 230d for selected digital asset 230e. The exchange system 220 may transmit a message I to the client logic device 205 associated with the selected digital asset 230e. The user of client logic device 205 may respond J indicating whether they approve or decline the exchange. If the user accepts the exchange, the requesting client logic device 210 may upload L the tradable digital assets 230c and 230d to the exchange system 220 and the client logic device 205 may download K the tradable digital asset from the exchange system. In addition, the client logic device 205 may upload K the selected digital asset 230e to the exchange system 220 and the requesting client logic device 215 may download L the selected digital asset from the exchange system.

If a user declined an exchange, the exchange system 220 may facilitate communication between user client logic devices to facilitate negotiation. In some embodiments, the exchange system 220 may provide suggested trades as part of the negotiation process. If the users negotiate an exchange of digital assets, the negotiated exchange may be transmitted to the exchange system 220 to facilitate the exchange. In some embodiments, users may be able to view portions of another user's assets to suggest an exchange. For example, a user may decline a requesting users initial offer to exchange asset A for asset B. This user may view the assets of the requesting user and suggest exchanging asset A for asset C of the requesting user.

Figure 3:
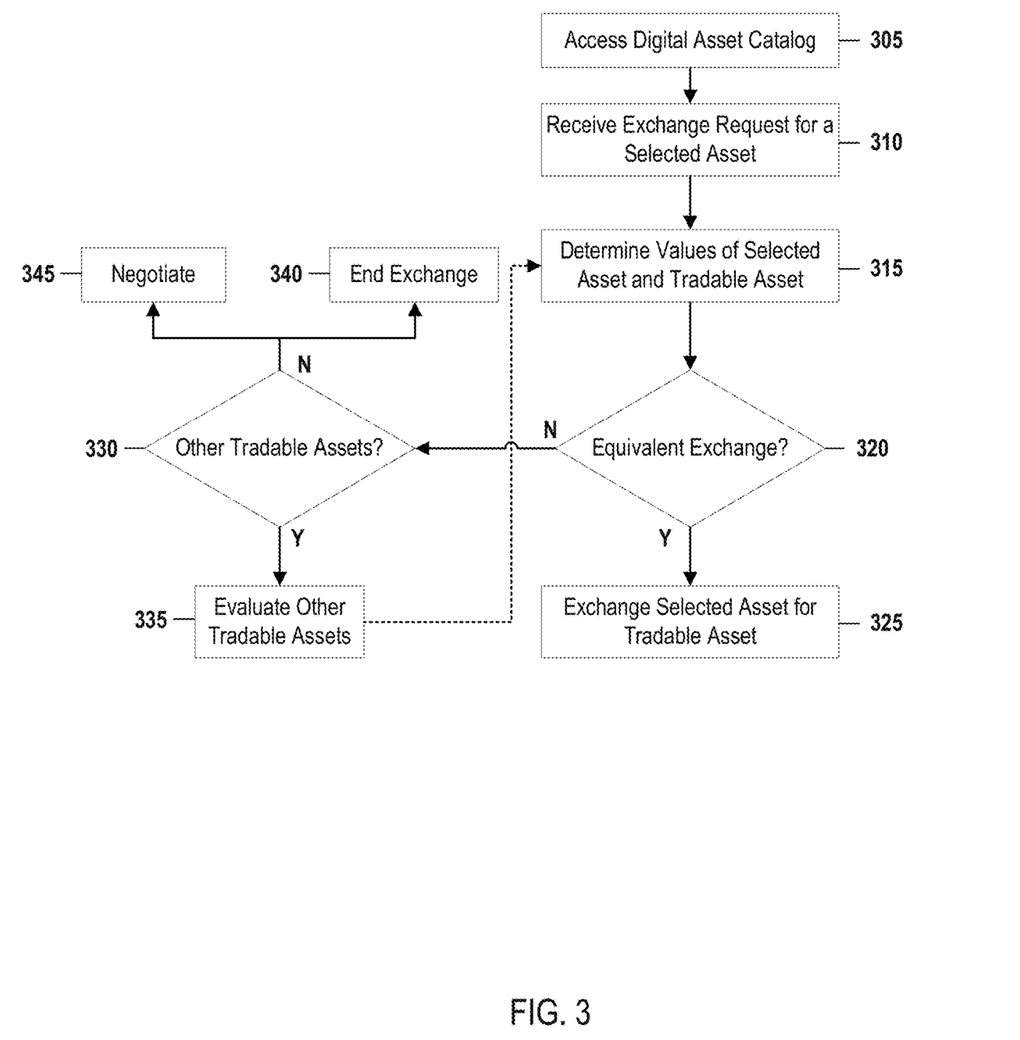
FIG. 3 depicts a flow diagram of an illustrative method for exchanging digital assets.

FIG. 3 depicts a flow diagram of an illustrative method for exchanging digital assets that may be performed by the exchange system, such as through a server logic device (i.e., server logic device 110 of FIG. 1), arranged in accordance with at least some embodiments described herein. Example methods may include one or more operations, functions or actions as illustrated by one or more of blocks 305, 310, 315, 320, 325, 330, 335, 340, and/or 345. The operations described in blocks 305-345 may also be stored as computer-executable instructions in a computer-readable medium such the memory elements 410, 415, and 425 depicted in FIG. 4. Although illustrated as discrete blocks, various blocks may be divided into additional blocks, combined into fewer blocks, or eliminated, depending on the desired implementation.

As shown in FIG. 3, an exchange system may access 305 a digital catalog. In some embodiments, the exchange system may create the digital catalog by accessing and cataloging digital assets, for example, stored on a plurality of computing devices, such as client logic devices and/or server logic devices, or external storage devices or networks. In some embodiments, the exchange system may access one or more third-party digital catalogs.

The exchange system may receive 310 an exchange request for a selected digital asset. For instance, the exchange request may request to trade a first movie digital asset in exchange for a second movie digital asset. The exchange system may determine 315 the value of the selected digital asset and a tradable digital asset offered in exchange therefor. If the values of the selected digital asset and the tradable digital asset are equivalent 320 or substantially equivalent, the exchange system may exchange 325 the selected digital asset for the tradable digital asset.

If the values of the selected digital asset and the tradable digital asset are not equivalent 320 or substantially equivalent, the exchange system may determine 330 whether the requesting user has any other tradable assets. If the user does have other tradable assets, the exchange system may evaluate 335 the other tradable assets. If the user does not have other tradable assets, the exchange system may facilitate and exchange 340 between the users or end the exchange 345.

Figure 4:
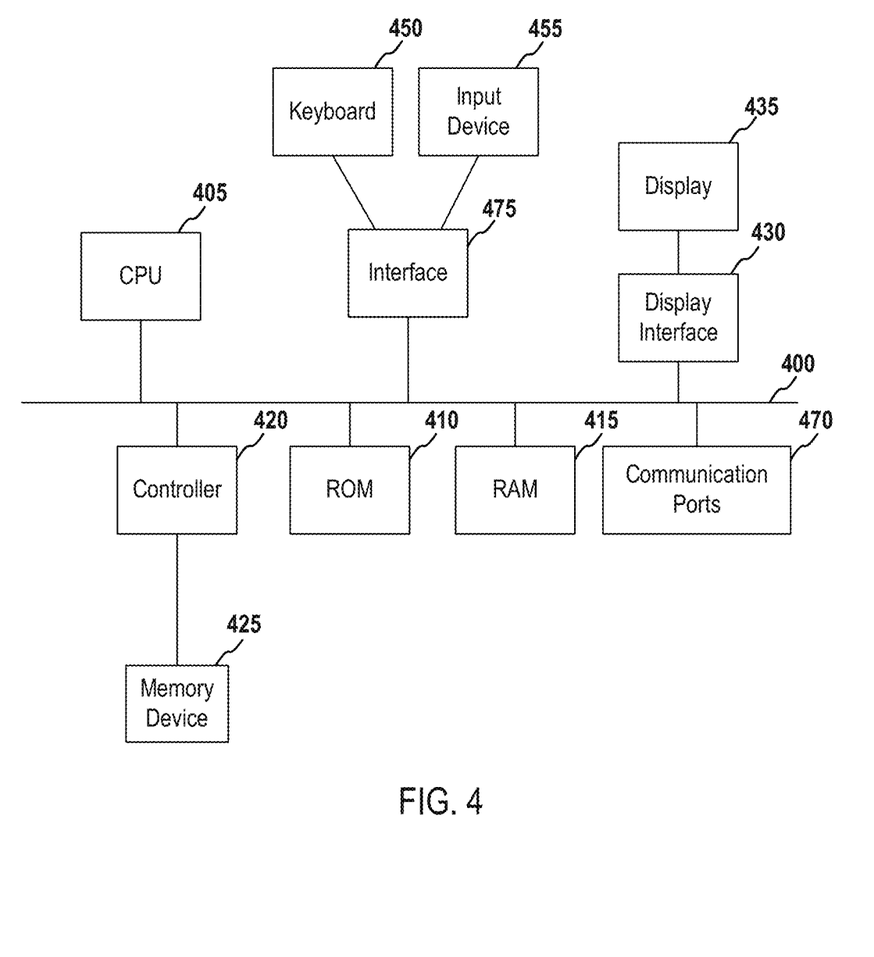
FIG. 4 illustrates various embodiments of a computing device for implementing the various methods and processes described herein.

FIG. 4 depicts a block diagram of exemplary internal hardware that may be used to contain or implement the various computer processes and systems as discussed above. A bus 400 serves as the main information highway interconnecting the other illustrated components of the hardware. CPU 405 is the central processing unit of the system, performing calculations and logic operations required to execute a program. CPU 405 is an exemplary processing device, computing device or processor as such terms are used within this disclosure. Read only memory (ROM) 430 and random access memory (RAM) 435 constitute exemplary memory devices.

A controller 420 interfaces with one or more optional memory devices 425 via the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with the determination, configuration, transmission, decoding, or the like of the presentation settings as described above may be stored in the ROM 430 and/or the RAM 435. Optionally, the program instructions may be stored on a tangible computer-readable medium such as a compact disk, a digital disk, flash memory, a memory card, a USB drive, an optical disc storage medium, such as a Blu-Ray™ disc, and/or other recording medium.

An optional display interface 430 can permit information from the bus 400 to be displayed on the display 435 in audio, visual, graphic or alphanumeric format. The information may include information related to a current job ticket and associated tasks. Communication with external devices may occur using various communication ports 470. An exemplary communication port 470 may be attached to a communications network, such as the Internet or a local area network.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

What is claimed is:

1. A system configured to exchange digital assets over a network, the system comprising:
   a processor; and
   a non-transitory, computer-readable storage medium in operable communication with the processor, wherein the computer-readable storage medium contains one or more programming instructions that, when executed, cause the processor to:
   compile a digital asset catalog comprising asset information associated with a plurality of digital assets stored on a plurality of client logic devices;
   receive an electronic exchange request from a first requesting client logic device, the electronic exchange request comprising at least one selected digital asset in the digital asset catalog offered by a second client logic device;
   obtain an asset value for the at least one selected digital asset from one or more, non-human, third-party value information sources;
   identify, without human intervention, in the digital asset catalog one or more tradeable digital assets from the digital asset catalog having a total tradeable value based on a tradeable value of each of the one or more tradeable digital assets, as determined by the one or more third-party value information sources, substantially equivalent to the asset value for the at least one selected digital asset,
   transmit the identification of the one or more tradeable assets to the first requesting client logic device; and
   execute an exclusive exchange of the at least one selected digital asset and the one or more tradable digital asset responsive to the total tradeable value being substantially equivalent to the asset value, wherein the exchange comprises uploading the at least one selected digital asset and the one or more tradeable assets to a central location and transmitting a download notification to the first and second logic devices.

2. The system of claim 1, wherein the computer-readable storage medium further contains one or more programming instructions that, when executed, cause the processor to generate the digital asset catalog based on the plurality of digital assets stored on the plurality of client logic devices.

3. The system of claim 1, wherein the plurality of digital assets comprise at least one of a movie digital asset, a television program digital asset, a song digital asset, and a book digital asset.

4. The system of claim 1, wherein the computer-readable storage medium further contains one or more programming instructions that, when executed, cause the processor to identify one or more additional tradeable digital assets in response to determining that the total tradable value is not substantially equivalent to the selected asset value, the one or more additional tradeable digital assets having the total tradeable value substantially equivalent to the asset value for the at least one selected digital asset.

5. The system of claim 1, wherein the computer-readable storage medium further contains one or more programming instructions that, when executed, cause the processor to initiate exchange negotiations responsive to determining that the total tradable value is not substantially equivalent to the selected asset value.

6. The system of claim 1, wherein the one or more third-party value information source may be at least one of a content database, a social network service, a crowdsourcing service, a content provider catalog, a retail information source, a proprietary database, and a user valuation.

7. The system of claim 1 wherein executing the exchange restricts usage of the at least one selected digital asset by the second client logic device and render the one or more tradeable digital assets unusable on the first client logic device.

8. The system of claim 7 wherein executing the exchange of the at least one selected digital asset comprises deleting the at least one digital asset from the second client logic device.

9. The system of claim 7 wherein executing the exchange of the at least one selected digital asset comprises locking the at least one digital asset on the second client logic device.

10. The system of claim 1 wherein substantially equivalent values comprises having a value within a tolerance threshold.

11. The system of claim 1 wherein executing the exchange of the at least one selected digital asset and the one or more tradeable digital assets further comprises:
downloading the at least one selected digital asset from the first client logic device to a central repository;
downloading the one or more tradeable digital assets from the second client logic device to the central repository; and
upon successful download of the at least one selected digital asset and the one or more tradeable digital assets, uploading the at least one digital asset to the second client logic device and uploading the one or more tradeable digital assets to the first client logic device.

12. The system of claim 1 wherein the combined tradeable value comprises a demand value for the one or more tradeable digital assets and adjusting the combined tradeable value of the one or more tradeable digital assets based on the demand value.

13. The system of claim 1 wherein the one or more tradeable assets comprise a first tradeable asset and a second tradeable asset, the first and second tradeable assets obtained from different client logic devices.

14. A computer-implemented method for exchanging digital assets over a network, the method comprising, by a processor:
compiling a digital asset catalog comprising asset information associated with a plurality of digital assets stored on a plurality of client logic devices;
receiving an electronic exchange request from a first requesting client logic device, the electronic exchange request comprising at least one selected digital asset in the digital asset catalog offered by a second client logic device-obtaining an asset value for the at least one selected digital asset from third-party value information sources;
identifying, without human intervention, in the digital asset catalog one or more tradeable digital assets from the digital asset catalog having a combined tradeable value based on a tradeable value of each of the one or more tradeable digital assets, as determined by the one or more, non-human, third-party value information sources substantially equivalent to the asset value for the at least one selected digital asset;
transmitting the identification of the one or more tradeable assets to the first requesting client logic device; and
executing an exchange of the at least one selected digital asset and the one or more tradable digital asset responsive to the combined tradeable value being substantially equivalent to the asset value, wherein the exchange comprises uploading the at least one selected digital asset and the one or more tradeable assets to a central location and transmitting a download notification to the first and second logic devices.

15. The method of claim 14, further comprising generating the digital asset catalog based on the plurality of digital assets stored on the plurality of client logic devices.

16. The method of claim 14, wherein the plurality of digital assets comprise at least one of a movie digital asset, a television program digital asset, a song digital asset, and a book digital asset.

17. The method of claim 14, further comprising identifying one or more additional tradeable digital assets in response to determining that the combined tradable value is not substantially equivalent to the selected asset value, the one or more additional tradeable digital assets having the combined tradeable value substantially equivalent to the asset value for the at least one selected digital asset.

18. The method of claim 14, further comprising initiating exchange negotiations responsive to determining that the combined tradable value is not substantially equivalent to the selected asset value.

19. The method of claim 14, wherein the selected asset value may be based on value information from at least one of a content database, a social network service, a crowdsourcing service, a content provider catalog, a retailer website, a proprietary database, and a user valuation.

20. A computer-readable storage medium having computer-readable program code configured to exchange digital assets over a network, the computer-readable program code comprising:
computer-readable program code configured to compile a digital asset catalog comprising asset information associated with a plurality of digital assets stored on a plurality of client logic devices;
computer-readable program code configured receive an electronic exchange request from a first requesting client logic device, the electronic exchange request comprising at least one selected digital asset in the digital asset catalog offered by a second client logic device;
computer-readable program code configured to obtain an asset value for the at least one selected digital asset from one or more, non-human, third-party value information sources;
computer-readable program code configured to identify, without human intervention, one or more tradeable digital assets from the digital asset catalog having a combined tradeable value based on a tradeable value of each of the one or more tradeable digital assets, as determined by the one or more third-party value information sources, substantially equivalent to the asset value for the at least one selected digital asset;

computer readable program code configured to transmit the identification of the one or more tradeable assets to the first requesting client logic device; and computer-readable program code configured to execute an exclusive exchange of the at least one selected digital asset and the one or more tradable digital asset responsive to the combined tradeable value being substantially equivalent to the asset value, wherein the exchange comprises uploading the at least one selected digital asset and the one or more tradeable assets to a central location and transmitting a download notification to the first and second logic devices.

* * * * *